United States Patent
Nakamura

(10) Patent No.: US 10,381,818 B2
(45) Date of Patent: Aug. 13, 2019

(54) COVERING PROCESSING TOOL AND COVERING PROCESSING METHOD

(71) Applicant: 3M INNOVATIVE PROPERTIES COMPANY, St. Paul, MN (US)

(72) Inventor: Tsunehisa Nakamura, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 250 days.

(21) Appl. No.: 15/328,338

(22) PCT Filed: Jul. 8, 2015

(86) PCT No.: PCT/US2015/039469
§ 371 (c)(1),
(2) Date: Jan. 23, 2017

(87) PCT Pub. No.: WO2016/018574
PCT Pub. Date: Feb. 4, 2016

(65) Prior Publication Data
US 2017/0222423 A1    Aug. 3, 2017

(30) Foreign Application Priority Data
Jul. 28, 2014  (JP) .................................. 2014-152952

(51) Int. Cl.
*H01R 4/00* (2006.01)
*H02G 15/18* (2006.01)
(Continued)

(52) U.S. Cl.
CPC ........... *H02G 15/1826* (2013.01); *H02G 1/00* (2013.01); *H02G 1/14* (2013.01); *H02G 15/188* (2013.01); *H02G 15/1833* (2013.01)

(58) Field of Classification Search
CPC .. H05K 9/0088; H05K 9/0007; H02G 15/184; H02G 15/1833
(Continued)

(56) References Cited

U.S. PATENT DOCUMENTS 3,990,661 A * 11/1976 De Groef .................. F16L 5/02
248/56
4,485,269 A * 11/1984 Steinberg ............... H02G 15/10
156/49

(Continued)

FOREIGN PATENT DOCUMENTS

EP        1852949       11/2007
JP     2001-16758       1/2001
(Continued)

OTHER PUBLICATIONS

EP Supplementary Search Report for Application No. EP 15827110, dated Feb. 5, 2018, 2pgs.

(Continued)

*Primary Examiner* — William H. Mayo, III
(74) *Attorney, Agent, or Firm* — Gregg H. Rosenblatt

(57) ABSTRACT

A covering processing tool performs a covering process of a cable connection portion and is provided with a first tubular unit extending in an axial direction, a second tubular unit disposed so as to surround the first tubular unit on an outer peripheral side, and a third tubular unit disposed so as to surround the first tubular unit on the outer peripheral side. The second tubular unit is installed on the first tubular unit so when extracting a first diameter expansion holding member of the first tubular unit, by supporting the second tubular unit from an outer peripheral side, relative movement in an axial direction and a circumferential direction of the first tubular unit relative to the second tubular unit is suppressed.

5 Claims, 10 Drawing Sheets

(51) Int. Cl.
  *H02G 1/14* (2006.01)
  *H02G 15/188* (2006.01)
  *H02G 1/00* (2006.01)

(58) Field of Classification Search
  USPC ........... 174/73.1, 74 R, 74 C, 78, 84 R, 88 C
  See application file for complete search history.

(56) References Cited

U.S. PATENT DOCUMENTS

| | | | | |
|---|---|---|---|---|
| 4,737,600 | A * | 4/1988 | Mathis | G02B 6/4476 174/74 A |
| 5,335,408 | A * | 8/1994 | Cobb | G02B 6/443 156/49 |
| 5,661,842 | A * | 8/1997 | Faust | H01R 4/72 174/93 |
| 5,856,634 | A * | 1/1999 | Borgstrom | H02G 1/14 174/135 |
| 6,434,317 | B1 * | 8/2002 | Dyer | G02B 6/4428 385/139 |
| 8,889,989 | B2 * | 11/2014 | Maher | H02G 15/064 138/109 |
| 9,224,520 | B2 * | 12/2015 | Spalding | H01B 3/30 |
| 9,425,605 | B2 * | 8/2016 | Yaworski | H02G 15/08 |
| 9,504,195 | B2 * | 11/2016 | Dinu | H02G 15/1833 |
| 2004/0262025 | A1 | 12/2004 | Brandt | |
| 2008/0121408 | A1 | 5/2008 | Portas et al. | |
| 2009/0218135 | A1 | 9/2009 | Vallauri | |
| 2010/0193235 | A1 * | 8/2010 | Taylor | H02G 15/103 174/363 |
| 2015/0214713 | A1 * | 7/2015 | Wu | H02G 15/046 174/73.1 |

FOREIGN PATENT DOCUMENTS

| | | |
|---|---|---|
| JP | 2001-145250 | 5/2001 |
| JP | 2006050849 A2 | 2/2006 |
| JP | 2007-325494 | 12/2007 |
| WO | WO 94/22196 | 9/1994 |
| WO | WO 97/32381 A1 * | 9/1997 ........... H02G 15/068 |

OTHER PUBLICATIONS

International Search Report for PCT International Application No. PCT/US2015/039469 dated Oct. 19, 2015, 3 pages.

* cited by examiner

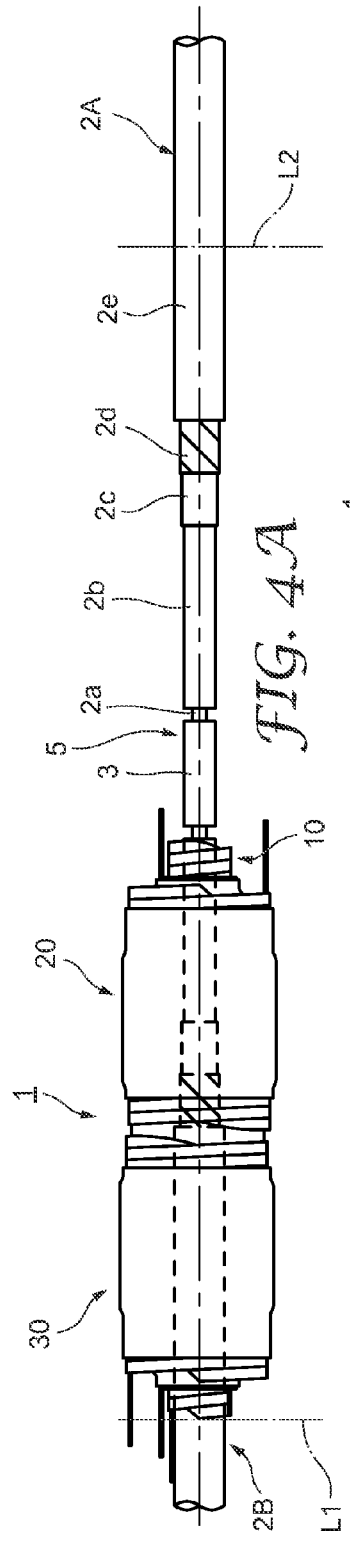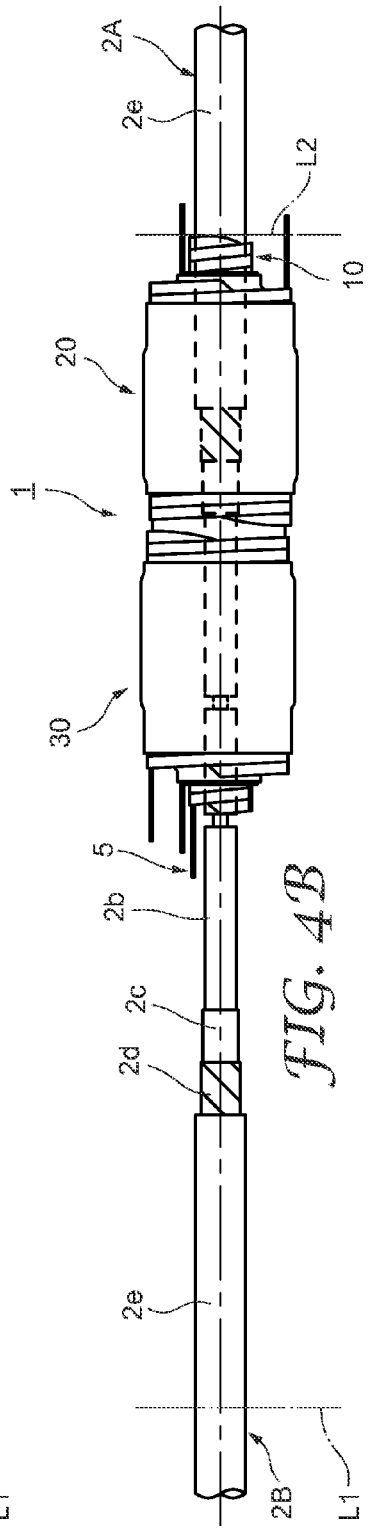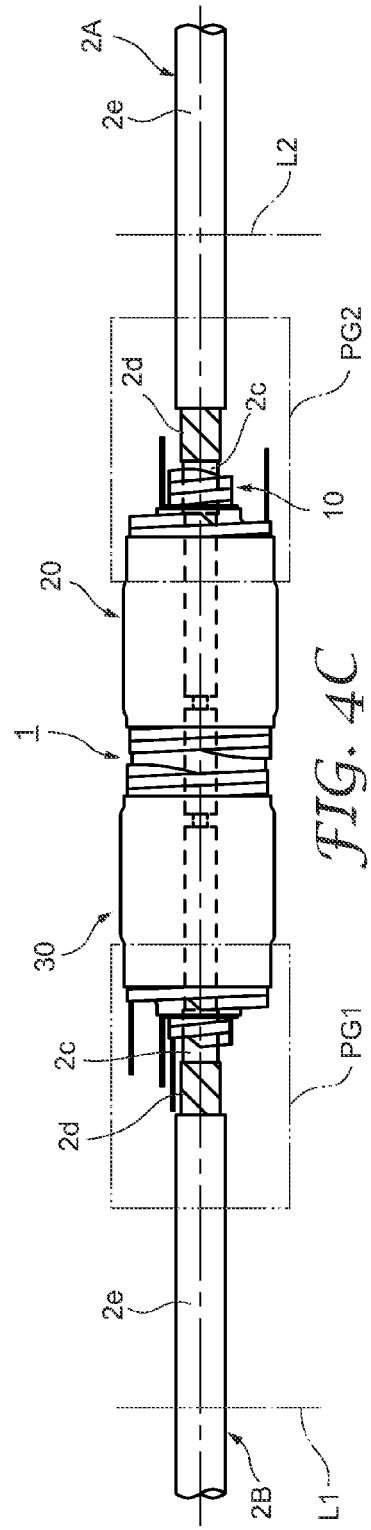

COVERING PROCESSING TOOL AND COVERING PROCESSING METHOD

FIELD OF THE INVENTION

The present invention relates to a covering processing tool and a covering processing method.

BACKGROUND ART

Conventionally, as a covering processing tool for covering a cable connection portion that connects cables to each other, a covering processing tool provided with a tubular and hollow diameter expansion holding member that can be disassembled and an elastic tubular member made from an elastic material such as rubber held in a state of diameter expansion on an outer peripheral side of the diameter expansion holding member is known (for example, see Patent Literature 1). With this covering processing tool, the connection portion is covered by the elastic tubular member contracted by disassembling the diameter expansion holding member. Moreover, covering is further performed by the elastic tubular member contracted by setting the diameter expansion holding member on both end portions of the covering portion and disassembling the diameter expansion holding member.

CITATION LIST

Patent Literature

Patent Literature 1: Japanese Patent Application Publication No. 2007-325494

SUMMARY OF THE INVENTION

Technical Problem

Here, in a situation where the cable connection portion is covered using, for example, a covering processing tool such as that described above, there is a problem where a covering operation is cumbersome to an operator. Therefore, there is a demand for improving an operation efficiency of covering the cable connection portion.

Solution to Problem

A covering processing tool according to one aspect of the present invention is a covering processing tool that performs a covering process of a cable connection portion, provided with: a first tubular unit that extends in an axial direction; a second tubular unit disposed so as to surround the first tubular unit on an outer peripheral side; and a third tubular unit disposed so as to surround the first tubular unit on the outer peripheral side; wherein the first tubular unit is provided with a tubular and hollow first diameter expansion holding member that is extractable, and a first elastic tubular member that is held in a state of diameter expansion on an outer peripheral side of the first diameter expansion holding member; the second tubular unit is provided with a tubular and hollow second diameter expansion holding member that is extractable, and a second elastic tubular member that is held in a state of diameter expansion on an outer peripheral side of the second diameter expansion holding member; the third tubular unit is provided with a tubular and hollow third diameter expansion holding member that is extractable, and a third elastic tubular member that is held in a state of diameter expansion on an outer peripheral side of the third diameter expansion holding member; and the second tubular unit is installed on the first tubular unit so when extracting the first diameter expansion holding member of the first tubular unit, by supporting the second tubular unit from the outer peripheral side, relative movement in the axial direction and a circumferential direction of the first tubular unit relative to the second tubular unit is suppressed.

According to such an aspect, the covering processing tool is provided with the first tubular unit and the second tubular unit and third tubular unit that surround the first tubular unit on the outer peripheral side. Moreover, each tubular unit is provided with a diameter expansion holding member and an elastic tubular member, respectively. Therefore, after covering the cable connection portion with the first elastic tubular member by extracting the diameter expansion holding member of the first tubular unit, both ends of the covered portion can be covered with the elastic tubular member of the second tubular unit and the third tubular unit, respectively. Here, the second tubular unit is installed on the first tubular unit so when extracting the first diameter expansion holding member of the first tubular unit, by supporting the second tubular unit from the outer peripheral side, relative movement in the axial direction and the circumferential direction of the first tubular unit relative to the second tubular unit is suppressed. Therefore, in an extraction operation of the first diameter expansion holding member of the first tubular unit, the first tubular unit can be supported by supporting the second tubular unit, even without an operator directly supporting the first tubular unit. By this, an operation for moving the second tubular unit for supporting the first tubular unit, a space for disposing the moved second tubular unit, and the like can be made unnecessary. By the above, an operation efficiency of covering the cable connection portion can be improved.

In a covering processing tool according to another aspect, the second tubular unit may be disposed so as to surround the first tubular unit on the outer peripheral side on one end side in the axial direction of the first tubular unit, the third tubular unit may be disposed so as to surround the first tubular unit on the outer peripheral side on another end side in the axial direction of the first tubular unit, and the third tubular unit may be installed on the first tubular unit so when extracting the first diameter expansion holding member of the first tubular unit, by supporting the third tubular unit from the outer peripheral side, relative movement in the axial direction and the circumferential direction of the first tubular unit relative to the third tubular unit is suppressed.

In a covering processing tool according to another aspect, the second tubular unit may be disposed so as to surround the third tubular unit on the outer peripheral side, and the second tubular unit may be installed on the first tubular unit so when extracting the first diameter expansion holding member of the first tubular unit, by supporting the second tubular unit from the outer peripheral side, relative movement in the axial direction and the circumferential direction of the first tubular unit relative to the second tubular unit is suppressed via the third tubular unit.

In a covering processing tool according to another aspect, a waterproof material having liquidity may be disposed between the second diameter expansion holding member and the second elastic tubular member and between the third diameter expansion holding member and the third elastic tubular member.

A covering processing method according to one aspect of the present invention is a covering processing method that performs a covering process of a cable connection portion using a covering processing tool, the covering processing tool provided with a first tubular unit that extends in an axial direction, a second tubular unit disposed so as to surround the first tubular unit on an outer peripheral side, and a third tubular unit disposed so as to surround the first tubular unit on the outer peripheral side; the first tubular unit provided with a tubular and hollow first diameter expansion holding member that is extractable, and a first elastic tubular member that is held in a state of diameter expansion on an outer peripheral side of the first diameter expansion holding member; the second tubular unit provided with a tubular and hollow second diameter expansion holding member that is extractable, and a second elastic tubular member that is held in a state of diameter expansion on an outer peripheral side of the second diameter expansion holding member; the third tubular unit provided with a tubular and hollow third diameter expansion holding member that is extractable, and a third elastic tubular portion that is held in a state of diameter expansion on an outer peripheral side of the third diameter expansion holding member; provided with: a first covering step that contracts the first elastic tubular member by extracting the first diameter expansion holding member of the first tubular unit and covers the cable connection portion with the contracted first elastic tubular member; a second covering step that contracts the second elastic tubular member by extracting the second diameter expansion holding member of the second tubular unit and covers the cable connection portion on one end side in the axial direction of the first elastic tubular member with the contracted second elastic tubular member; and a third covering step that contracts the third elastic tubular member by extracting the third diameter expansion holding member of the third tubular unit and covers the cable connection portion on another end side in the axial direction of the first elastic tubular member with the contracted third elastic tubular member; wherein in the first covering step, when extracting the first diameter expansion holding member, by supporting the second tubular unit from the outer peripheral side, relative movement in the axial direction and a circumferential direction of the first tubular unit relative to the second tubular unit is suppressed.

Advantageous Effects of Invention

According to the present invention, the operation efficiency of covering the cable connection portion can be improved.

BRIEF DESCRIPTION OF DRAWINGS

FIG. 4 is a view illustrating positional relationships between the covering processing tool and the cable connection portion.

DESCRIPTION OF EMBODIMENTS

Embodiments of the present invention will be described in detail below with reference to the attached drawings. Note that in the description below, identical or corresponding elements will be labeled with identical reference signs, and redundant description will be omitted.

Figure 1:
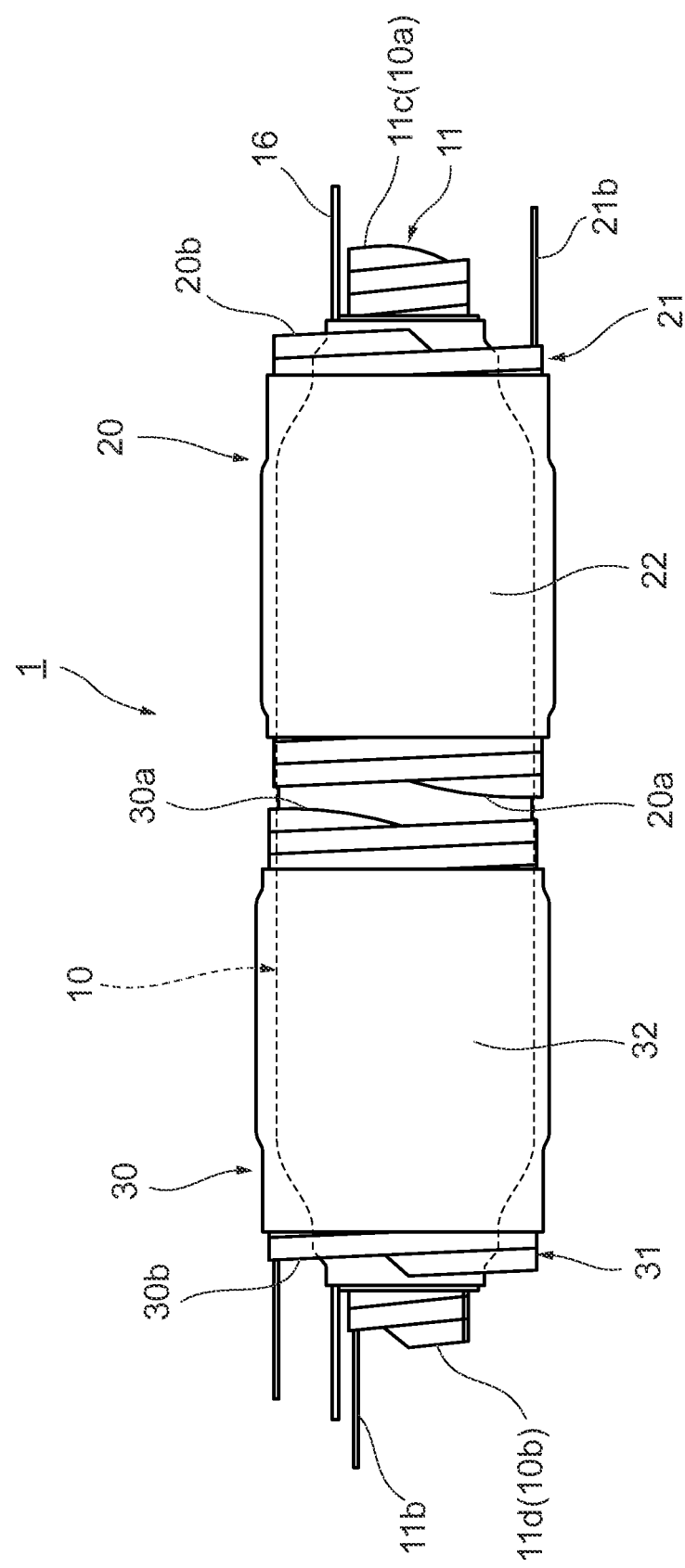
FIG. 1 is a view illustrating a covering processing tool according to the present embodiment.
Figure 2:
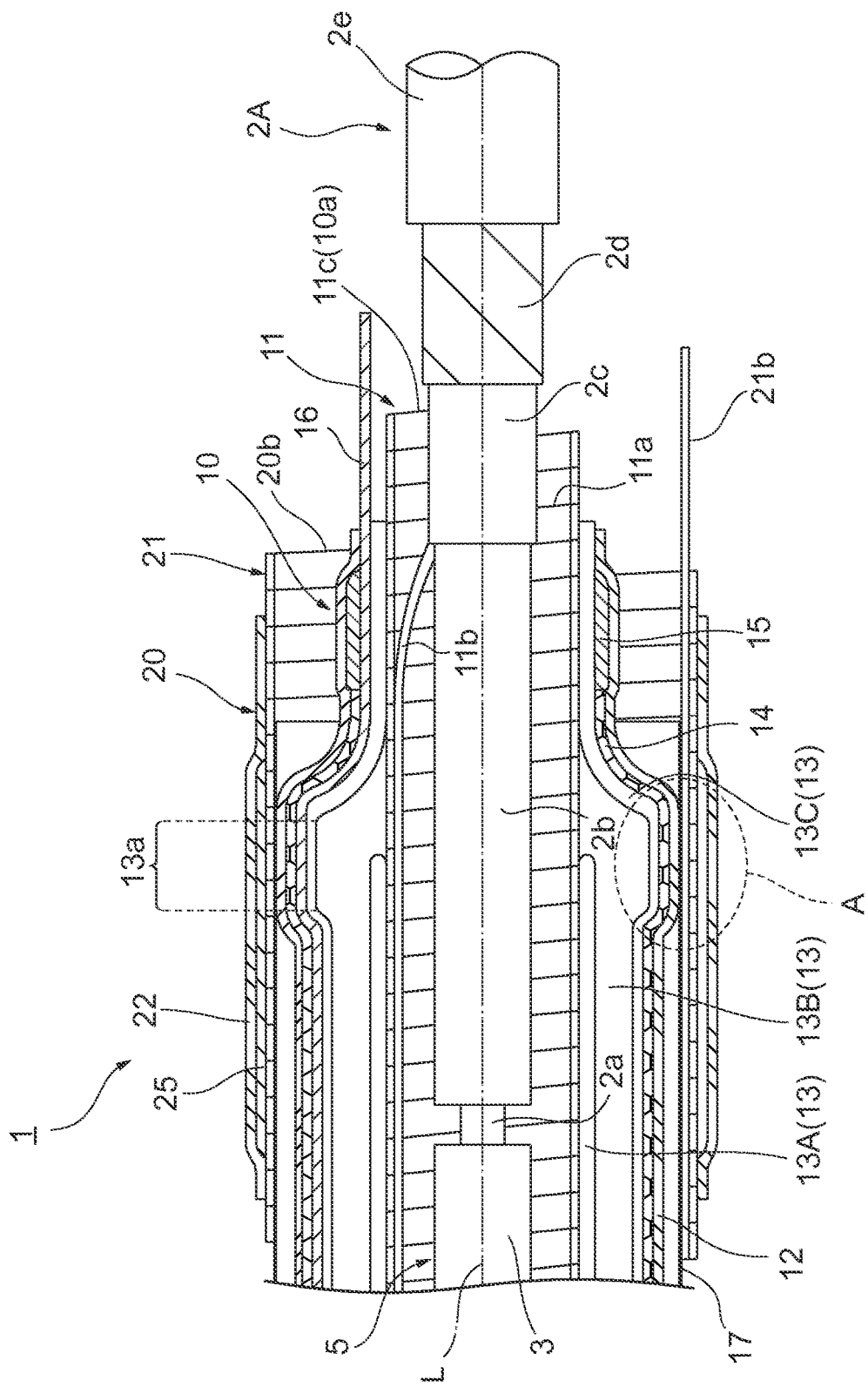
FIG. 2 is a cross-sectional enlarged view of the covering processing tool illustrated in FIG. 1.
Figure 3:
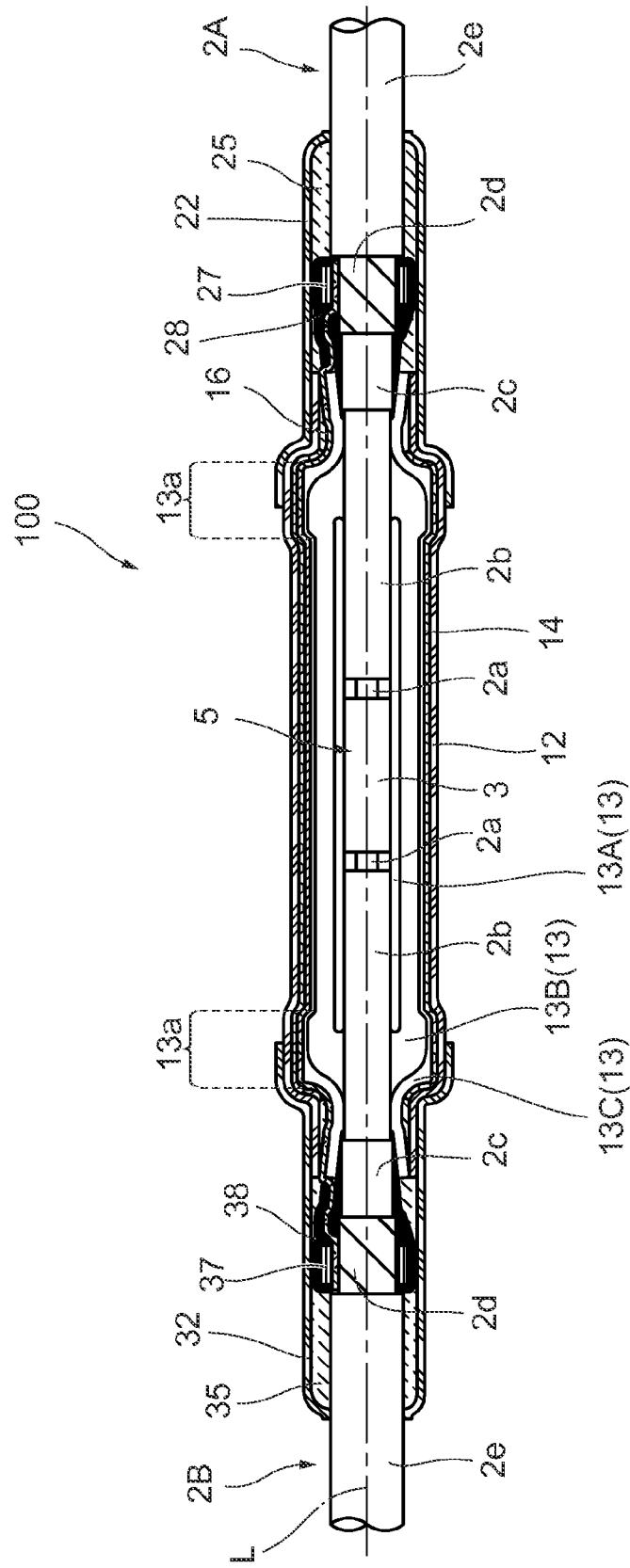
FIG. 3 is a view illustrating a state where a cable connection portion is covered using the covering processing tool.

FIG. 1 is a view illustrating a covering processing tool according to the present embodiment. FIG. 2 is a cross-sectional enlarged view of the covering processing tool illustrated in FIG. 1. FIG. 3 is a view illustrating a state where a cable connection portion is covered using the covering processing tool. Note that description will be given by referring to the state illustrated in FIG. 3 as a "covered state." Cables 2A, 2B illustrated in FIG. 3 are, for example, power cables used as electrical wires for power supply. A conductor $2a$ exposed from a tip of the cable 2A and a conductor $2a$ exposed from a tip of the cable 2B are connected via a connection tube 3. A cable connection portion 5 is configured thereby. A covering processing tool 1 is a tool for performing connection of the cable connection portion 5. In the present embodiment, the term "cable" includes not only a power cable but also a communication cable, an optical communication cable, and the like.

The cable 2A is provided with the conductor $2a$, an insulator $2b$, a semiconductive layer $2c$, a cable shielding layer $2d$, and a cable sheath $2e$. The conductor $2a$, the insulator $2b$, the semiconductive layer $2c$, the cable shielding layer $2d$, and the cable sheath $2e$ are disposed in this order from an inner periphery toward an outer periphery. Moreover, the conductor $2a$, the insulator $2b$, the semiconductive layer $2c$, the cable shielding layer $2d$, and the cable sheath $2e$ are exposed from a tip side in this order. Note that because the cable 2B has a configuration similar to that of the cable 2A, description will be omitted.

The insulator $2b$ is a portion configured by an insulating resin or the like and covers an outer peripheral surface of the conductor $2a$.

The semiconductive layer $2c$ is a layer having semiconductivity and is configured by, for example, impregnating a cloth or a paper with a conductive substance such as carbon. The semiconductive layer $2c$ is disposed on an inner peripheral side of the cable shielding layer $2d$ and has an effect of making uniform a local high electrical field portion arising at an overlap between cable shielding layers $2d$ and increasing an insulation property of the cable 2A.

The cable shielding layer $2d$ is a conductive layer provided for preventing electrical shock and for flowing a leakage current of the cable 2A. A material of the cable shielding layer $2d$ is, for example, copper tape, and in this situation, the cable shielding layer $2d$ is also referred to as a shielding copper tape. The cable shielding layer $2d$ covers an outer periphery of the semiconductive layer $2c$. The cable sheath $2e$ is configured by, for example, vinyl chloride or polyethylene. The cable sheath $2e$ covers an outer periphery of the cable shielding layer $2d$.

Next, a configuration of the covering processing tool 1 according to the present embodiment will be described.

As described in FIG. 1 and FIG. 2, the covering processing tool 1 is provided with a first tubular unit 10 extending in an axial direction, a second tubular unit 20 disposed so as to surround the first tubular unit 10 on an outer peripheral side, and a third tubular unit 30 disposed so as to surround the first tubular unit 10 on the outer peripheral side. In the present embodiment, the second tubular unit 20 is disposed so as to surround the first tubular unit 10 on the outer peripheral side on one end 10a side in the axial direction of the first tubular unit 10. The third tubular unit 30 is disposed so as to surround the first tubular unit 10 on the outer peripheral side on another end 10b side in the axial direction of the first tubular unit 10.

The first tubular unit 10 is provided with a tubular and hollow core member (first diameter expansion holding member) 11 that is extractable, a tube member (first elastic tubular member) 12 that is held in a state of diameter expansion on an outer peripheral side of the core member 11, an insulating tube 13 disposed between the core member 11 and the tube member 12, a waterproof protective layer 14 disposed between the insulating tube 13 and the tube member 12, a waterproof mastic 15 disposed on an end portion on both sides of the waterproof protective layer 14, a grounding wire 16 extending along the axial direction, and a slip material 17 disposed so as to cover an outer periphery of the tube member 12.

The core member 11 is a tubular and hollow member of a cylindrical shape having a disassembly line formed on a wall surface along an entire length. The disassembly line is provided so as to progress in an axis L direction while revolving or revolving and inverting around the axis L of the core member 11. Note that in the present embodiment, as the disassembly line, a continuous spiral groove 11a is provided that is provided so as to progress in the axis L direction (axial direction of the diameter expansion holding member) while revolving around the axis L of the core member 11. Herein below, "disassembly line" will be described as the continuous spiral groove 11a. As a material of the core member 11, for example, a resin such as polyethylene, polypropylene, ABS, or the like is used. Moreover, as needed, a multilayer structure can be provided with these resins. The core member 11 is made to be extractable as a core ribbon 11b that is a string-like body along the continuous spiral groove 11a. A portion where the continuous spiral groove 11a is formed has a smaller thickness than a vicinity of the continuous spiral groove 11a and is made to be a portion that breaks easily. Moreover, the disassembly line is not limited to an aspect of being formed in a spiral shape as in the continuous spiral groove 11a; may be formed, for example, in an SZ shape; and can be made to be any shape if it is extractable.

Therefore, when the core ribbon 11b is pulled, the core member 11 sequentially breaks at the portion of the continuous spiral groove 11a and is continuously extracted as a new core ribbon 11b. Because the continuous spiral groove 11a is formed at a constant pitch, a width of the extracted core ribbon 11b also becomes constant. However, it does not have to be constant. The continuous spiral grove 11a may be formed only on an inner peripheral surface, formed only on an outer peripheral surface, or formed on both the inner peripheral surface and the outer peripheral surface of the core member 11. Moreover, manufacture of the core member 11 having the continuous spiral groove 11a may be performed by, for example, spirally turning the core ribbon 11b and fixing adjacent core ribbons 11b by adhesion, welding, engagement, a combination thereof, or the like and may be performed by directly forming the continuous spiral groove 11a on a cylindrical member. Moreover, as the tubular and hollow diameter expansion holding member that is extractable, there is an aspect where, as described above, the diameter expansion holding member is ribbon-shaped and the tube member 12 is sequentially reduced in diameter by unraveling the ribbon as well as an aspect where the diameter expansion holding member slides relative to the elastic tubular member and is detached by being extracted from the elastic tubular member.

The core member 11 has a first end portion 11c that becomes a starting end side of being extracted as the core ribbon 11b and a second end portion 11d (see FIG. 1) that becomes an ending end side of being extracted as the core ribbon 11b. Near the first end portion 11c, an exposed portion where the tube member 12 is not wrapped and the outer peripheral surface of the core member 11 is exposed is formed, and near the second end portion 11d as well, an exposed portion where the tube member 12 is not wrapped and the outer peripheral surface of the core member 11 is exposed is formed.

The core ribbon 11b disassembled from the first end portion 11c is passed through on an inner side of the core member 11 and extracted from a second end portion 11d side. By the core ribbon 11b being extracted on the second end portion 11d side, the core member 11 is sequentially disassembled from the first end portion 11c toward the second end portion 11d. Note that in the present embodiment, because the continuous spiral groove 11a is formed across the entire length of the core member 11, it is possible to completely disassemble the core member 11 from the first end portion 11c to the second end portion 11d. However, it is sufficient that a continuous spiral groove is formed in at least a portion of the core member 11 where the tube member 12 is held by diameter expansion; for example, there may be a portion where a continuous spiral groove is not formed in a predetermined region on the second end portion 11d side.

The tube member 12 is a member that is held in the state of diameter expansion on the outer peripheral side of the core member 11 and is a member that serves as an outer covering that covers the cable connection portion 5. The tube member 12 is, for example, a cold shrink tube that is configured by a rubber that contracts at a normal temperature and excels in an elastic property. As a material of the tube member 12, for example, ethylene propylene rubber, silicone rubber, or the like is used. The tube member 12 is held by the core member 11 in the state of diameter expansion, but by the core member 11 being sequentially disassembled by the core ribbon 11b of the core member 11 being extracted, holding by the core member 11 at the disassembled portion is gradually released. Then, by the tube member 12 contracting and being reduced in diameter at this portion, the tube member 12 comes to cover the cable connection portion 5. A length of the tube member 12 in the axial direction is set to a length to an extent where, in a covered state, the cable shielding layer 2d of the cable 2A and the cable 2B can be exposed. By this, after covering the cable connection portion 5 with the tube member 12, an operation of connecting the grounding wire 16 and the cable shielding layer 2d can be performed. In the present embodiment, both end portions of the tube member 12 are disposed in a position corresponding to the semiconductive layer 2c of the cable 2A and the cable 2B, but a length is not limited in particular.

With the insulating tube 13, ethylene propylene rubber, silicone rubber, or the like, whose insulation property is high and which excels in molding workability, is used as a base rubber, and it is configured as a component where an internal conductive layer 13A, a reinforcing insulator 13B, and an external conductive layer 13C are integrally molded to become, for example, a fusiform shape. However, depending on a voltage, the insulating tube 13 does not have to be a fusiform shape and may be a simple cylindrical shape. The insulating tube 13 is held in a state of diameter expansion on the outer peripheral side of the core member 11. The internal conductive layer 13A is provided so as to cover the connection tube 3 and a tip vicinity of the insulator 2b of the cables 2A, 2B in the covered state. The reinforcing insulator 13B is disposed on an outer peripheral side of the internal conductive layer 13A and provided in a wider range in the axial direction than the internal conductive layer 13A. The external conductive layer 13C is disposed on an outer peripheral side of the reinforcing insulator 13B and provided in a wider range in the axial direction than the reinforcing insulator 13B. In the present embodiment, a length of the external conductive layer 13C is set to be substantially the same as that of the tube member 12. Note that the reinforcing insulator 13B is thick near both ends of the internal conductive layer 13A. By this, the insulating tube 13 has a large diameter portion 13a where a diameter is set to be large on both end sides in the axial direction. However, a shape of the insulating tube 13 is not limited in particular, and an entirety may be the same thickness, matching the thickness of both end portions of the reinforcing insulator 13B. Therefore, a large diameter portion such as that of the present embodiment does not have to be formed.

The waterproof protective layer 14 is disposed on an outer peripheral surface of the external conductive layer 13C of the insulating tube 13. Moreover, the tube member 12 is disposed on an outer peripheral surface of the waterproof protective layer 14. The waterproof protective layer 14 is a member for being able to secure waterproofing even in a situation where damage or the like occurs in the tube member 12. As a material of the waterproof protective layer 14, for example, a sheet that provides a butyl rubber layer on polyethylene; a waterproof material having liquidity (waterproof material in a putty state), for example, a silicone rubber compound, a butyl rubber compound, or the like; or the like is adopted. The waterproof mastic 15 is disposed in a position adjacent to both end portions in an axial direction of the waterproof protective layer 14. The waterproof mastic 15 is configured by a waterproof material having liquidity (waterproof material in a putty state). As the waterproof mastic 15, for example, a silicone rubber compound, a butyl rubber compound, or the like can be used.

The grounding wire 16 is disposed between the external conductive layer 13C of the insulating tube 13 and the waterproof protective layer 14 and is a string-like member extending in the axial direction. The grounding wire 16 is configured by, for example, a plain stitch copper wire, a copper twisted wire, or the like and is set to a length where the cable shielding layer 2d of the cable 2A and the cable shielding layer 2d of the cable 2B can be connected.

The slip material 17 is a member disposed on an outer peripheral surface of the tube member 12. The slip material 17 is a member for securing ease of sliding when installing the second tubular unit 20 and the third tubular unit 30 on an outer periphery of the first tubular unit 10. The slip material 17 is configured by a sheet made from, for example, polyester, a release paper, or the like; grease; oil; or the like. Note that the ease of sliding of the slip material 17 will be described below in conjunction with relationships between diameters of each tubular unit 10 to 30.

The second tubular unit 20 is provided with a tubular and hollow core member (second diameter expansion holding member) 21 that is extractable, a tube member (second elastic tubular member) 22 that is held in a state of diameter expansion on an outer peripheral side of the core member 21, and a waterproof mastic 25 disposed between the core member 21 and the tube member 22. As the core member 21, the tube member 22, and the waterproof mastic 25, members are used that are similar (other than in length and disposition) to the core member 11, the tube member 12, and the waterproof mastic 25 used in the first tubular unit 10. Note that the second tubular unit 20 is an independent and separable member from the first tubular unit 10 and the third tubular unit 30. That is, as in a covering processing tool 300 (see FIG. 7) according to a comparative example that will be described below, a tube member held in diameter expansion on one core member and a tube member held in diameter expansion on another core member are not continuously connected. The tube member 22 of the second tubular unit 20 is separated from the tube member 12 of the first tubular unit 10 and separated from a tube member 32 of the third tubular unit 30. The second tubular unit 20 is disposed so an end portion 20b on a side where a core ribbon 21b of the core member 21 is extracted faces the one end 10a side in the axial direction of the first tubular unit 10.

The third tubular unit 30 is provided with a tubular and hollow core member (third diameter expansion holding member) 31 that is extractable, a tube member (third elastic tubular member) 32 that is held in a state of diameter expansion on an outer peripheral side of the core member 31, and a waterproof mastic 35 disposed between the core member 31 and the tube member 32. The third tubular unit 30 has a configuration similar to that of the second tubular unit 20. The third tubular unit 30 is disposed so an end portion 30b on a side where a core ribbon 31b of the core member 31 is extracted faces the other end 10b side in the axial direction of the first tubular unit 10.

In the present embodiment, a total length of the second tubular unit 20 and the third tubular unit 30 is set smaller than a length that is half a total length of the first tubular unit 10. By this, when the second tubular unit 20 and the third tubular unit 30 are installed on the outer peripheral side of the first tubular unit 10, the end portion 20b of the second tubular unit 20 does not protrude to an axial direction outer side from the one end 10a of the first tubular unit 10 and the end portion 30b of the third tubular unit 30 dose not protrude to an axial direction outer side from the other end 10b of the first tubular unit 10. However, a length of the second tubular unit 20 and the third tubular unit 30 is not limited in particular and may be suitably changed according to a structure of the cable connection portion 5. For example, it is preferable, due to positioning relationships, to set the second tubular unit 20 to a size that does not cover the one end 10a, but because the other end 10b of the first tubular unit 10 does not have a positioning element, the third tubular unit 30 may be set to a size that covers the other end 10b.

Here, an installation structure of the second tubular unit 20 and the third tubular unit 30 relative to the first tubular unit 10 in the covering processing tool 1 according to the present embodiment will be described.

In the present embodiment, the second tubular unit 20 is installed on the first tubular unit 10 so when extracting the first core member 11 of the first tubular unit 10, by supporting the second tubular unit 20 from an outer peripheral side, relative movement in the axial direction and a circumferential direction of the first tubular unit 10 relative to the second tubular unit 20 is suppressed. Moreover, the third tubular unit 30 is installed on the first tubular unit 10 so when extracting the first core member 11 of the first tubular unit 10, by supporting the third tubular unit 30 from an outer peripheral side, relative movement in the axial direction and the circumferential direction of the first tubular unit 10 relative to the third tubular unit 30 is suppressed.

Specifically, the above relationships are established by adjusting a dimensional relationship between an inner diameter of the second tubular unit 20 (inner diameter of the core member 21) and an outer diameter of the first tubular unit 10 (outer diameter of the tube member 12). In the present embodiment, because the tube member 12 is overhanging on the outer peripheral side at the large diameter portion 13a, this portion (illustrated by A in FIG. 2; referred to herein below as "portion A") becomes a portion with the greatest outer diameter in the first tubular unit 10. Moreover, because the core ribbon 21b of the core member 21 is interposed between the tube member 12 and the core member 21, a need arises of also considering a thickness of the core ribbon 21b. By supporting the second tubular unit 20 from the outer peripheral side, to suppress relative movement of the first tubular unit 10, in a situation where the inner diameter of the core member 21 is defined as "D2," an outer diameter of the portion A of the tube member 12 is defined as "D1," and the thickness of the core ribbon 21b is defined as "t," it is favorable for a relationship of "D2>D1+t" to be established. Moreover, a size of a gap (=D2−D1−t) is set to a range where the first tubular unit 10 can be gripped via the second tubular unit 20 by an operator supporting the second tubular unit 20 and deforming the second tubular unit 20. Specifically, the gap is preferably in a range of 0 mm to 6 mm and more preferably in a range of 2.5 mm to 4.5 mm. However, a need arises of press fitting when installing the second tubular unit 20 on the outer periphery of the first tubular unit 10, but a relationship of "D2<D1+t" may be established. Note that because a relationship similar to that of the second tubular unit 20 is established with the third tubular unit 30, description will be omitted.

As described above, the slip material 17 is disposed on an outermost peripheral portion of the first tubular unit 10. By this, even in a situation where a gap between an inner peripheral surface of the core member 21 and the outer peripheral surface of the tube member 12 is small (or in a situation where there is no gap), the second tubular unit 20 and the third tubular unit 30 can be smoothly installed on the first tubular unit 10. However, the slip material 17, when supporting the second tubular unit 20 and the third tubular unit 30, has a frictional force of an extent that can suppress relative movement of the first tubular unit 10.

A covering structure 100 after the cable connection portion 5 is covered by the covering processing tool 1 will be described with reference to FIG. 3. Among the cable connection portion 5, the connection tube 3 and a vicinity of the insulator 2b of the cables 2A, 2B are covered by the tube member 12 and the like of the first tubular unit 10. Moreover, a region between one end portion vicinity of the tube member 12 of the first tubular unit 10 and a tip vicinity of the cable sheath 2e of the cable 2A is covered by the tube member 22 and the like of the second tubular unit 20. Moreover, a region between another end portion vicinity of the tube member 12 of the first tubular unit 10 and a tip vicinity of the cable sheath 2e of the cable 2B is covered by the tube member 32 and the like of the third tubular unit 30.

In the covering structure 100, among the cable connection portion 5, the connection tube 3; the insulator 2b of the cables 2A, 2B; and a portion of the semiconductive layer 2c are covered by the insulating tube 13, the waterproof protective layer 14, and the tube member 12. Moreover, the grounding wire 16 is protruding from both ends of the tube member 12. One end portion of the grounding wire 16 is connected to the cable shielding layer 2d of the cable 2A via a grounding spring 27. Moreover, on a portion connecting the grounding wire 16 by the grounding spring 27, a semiconductive tape 28 is wrapped. Another end portion of the grounding wire 16 is connected to the cable shielding layer 2d of the cable 2B via a grounding spring 37. Moreover, on a portion connecting the grounding wire 16 by the grounding spring 37, a semiconductive tape 38 is wrapped. Note that a semiconductive tape needs to be wrapped at least on a portion straddling the semiconductive layer 2c and the cable shielding layer 2d, but a semiconductive tape or an insulating tape may be wrapped on an outer peripheral side of the grounding wire 16 and the grounding springs 27, 37.

In the covering structure 100, among the cable connection portion 5, a portion of the insulator 2b of the cable 2A, the semiconductive layer 2c, the cable shielding layer 2d, and a portion on a tip side of the cable sheath 2e are covered by the tube member 22 of the second tubular unit 20. One end portion of the tube member 22 extends to a portion of the cable sheath 2e, and another end portion extends to a position on the tube member 12 corresponding to the large diameter portion 13a. However, the tube member 22 coves the insulator 2b, the semiconductive layer 2c, and the cable shielding layer 2d via the tube member 12 or the semiconductive tape 28. Moreover, the tube member 22 covers the cable sheath 2e via the waterproof mastic 25.

In the covering structure 100, among the cable connection portion 5, the insulator 2b, which is a portion of the cable 2B; the semiconductive layer 2c, the cable shielding layer 2d, and a portion on a tip side of the cable sheath 2e are covered by the tube member 32 of the third tubular unit 30. One end portion of the tube member 32 extends to a portion of the cable sheath 2e, and another end portion extends to a position on the tube member 12 corresponding to the large diameter portion 13a. However, the tube member 32 coves the insulator 2b, the semiconductive layer 2c, and the cable shielding layer 2d via the tube member 12 or the semiconductive tape 38. Moreover, the tube member 32 covers the cable sheath 2e via the waterproof mastic 35.

Next, a covering processing method using the covering processing tool 1 according to the present embodiment will be described, and actions and effects of the covering processing tool 1 and the covering processing method will be described.

Figure 7:
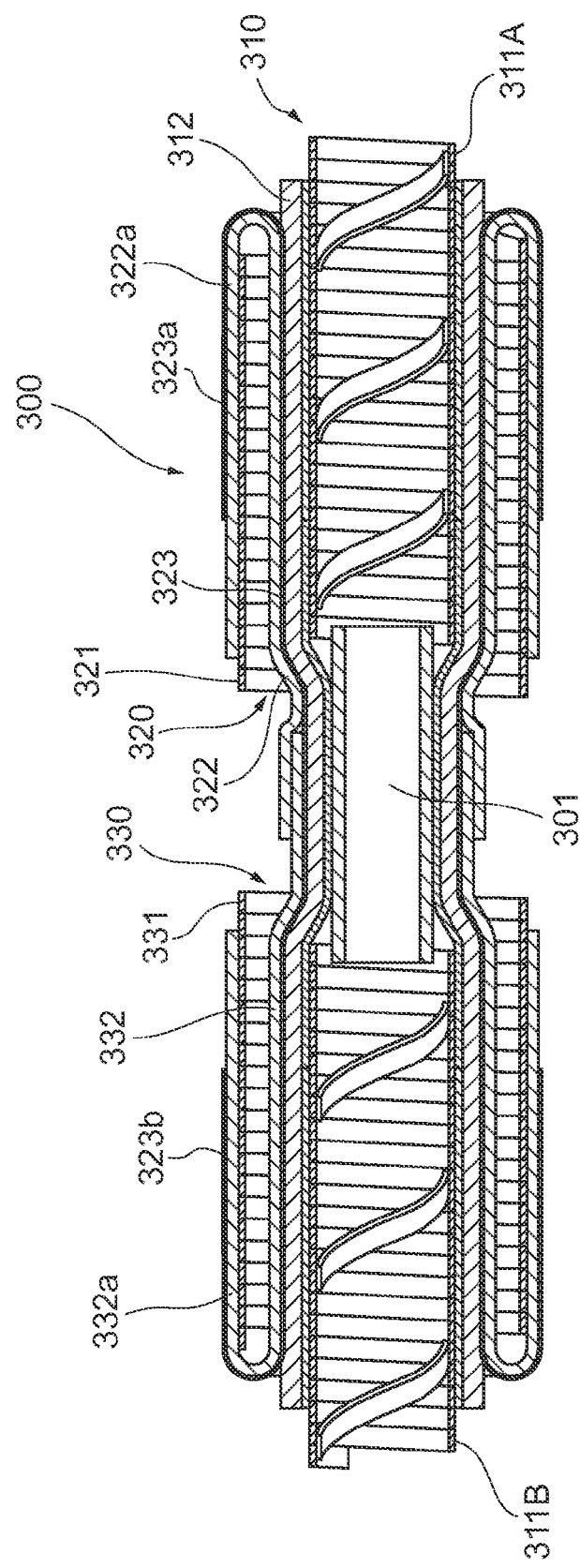
FIG. 7 is a cross-sectional view of a covering processing tool according to a comparative example.

First, a problem in a situation of using a covering processing tool according a comparative example will be described with reference to FIGS. 7 to 10. FIG. 7 is a cross-sectional view of the covering processing tool 300 according to the comparative example. As illustrated in FIG. 7, the covering processing tool 300 is provided with a pair of core members 311A, 311B disposed along an axial direction and a connection socket 301 disposed between the core members 311A, 311B. A tube member 312 is disposed on an outer peripheral surface of the core members 311A, 311B and connection socket 301. A conductive tubular shielding mesh 323 and, further, tube members 322, 332 are disposed on an outer peripheral surface of the tube member 312. The tube member 322 is disposed on a core member 311A side and folded at a tip vicinity of the core member 311A. A folded portion 322a is held in diameter expansion from an inner peripheral side by the core member 321. The shielding mesh 323 is similarly folded and is present as a mesh folded portion 323a on an outer periphery of the folded portion 322a. The tube member 332 is disposed on a core member 311B side and folded at a tip vicinity of the core member 311B. A folded portion 332a is held in diameter expansion from an inner peripheral side by the core member 331. The shielding mesh 323 is similarly folded and is present as a mesh folded portion 323b on an outer periphery of the folded portion 332a.

Figure 8A:
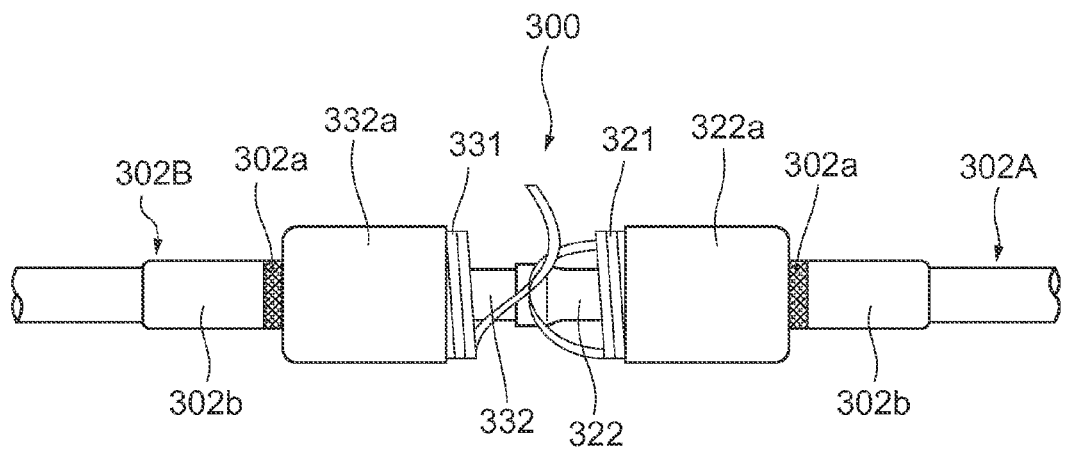
FIG. 8 is a view illustrating a covering processing method using the covering processing tool illustrated in FIG. 7.
Figure 8B:
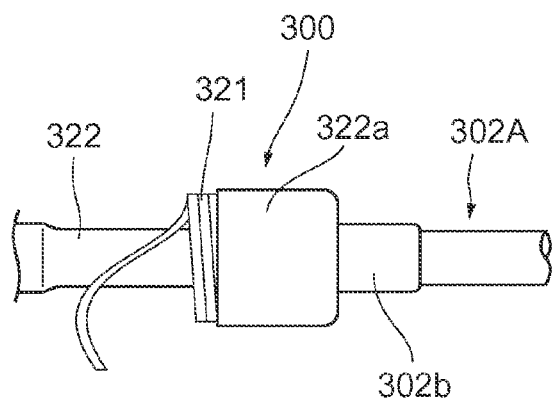
Figure 8C:
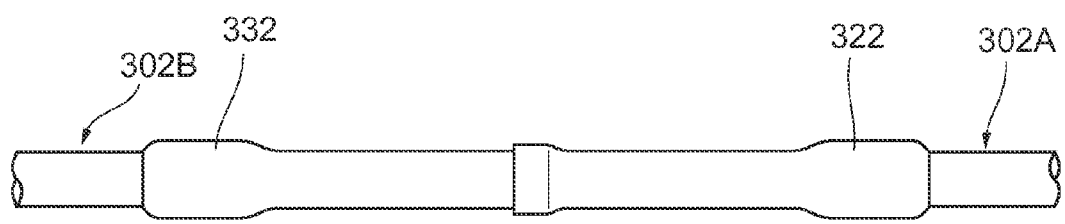

Next, a covering processing method in a situation where the covering processing tool 300 according to the comparative example is used will be described with reference to FIG. 8. As illustrated in FIG. 8(a), the cable connection portion is covered by the tube member 312 by covering the covering processing tool 300 on the cable connection portion of the cables 302A, 302B and disassembling the core members 311A, 311B. Moreover, the grounding portion 302a is formed by connecting the cable shielding layer on a cable 302A, 302B side and the shielding mesh 323 on a covering processing tool 300 side. Moreover, a waterproof portion 302b is formed by wrapping a waterproof tape on the cables 302A, 302B. Next, as illustrated in FIG. 8(b), the folded portion 322a of the tube member 322 is covered on the cable 302A by moving the core member 321 to a cable 302A side while disassembling the core member 321. The core member 331 is also similarly disassembled to cover the folded portion 332a on the cable 302B. By this, as illustrated in FIG. 8(c), the grounding portion 302a of the cables 302A, 302B and the waterproof portion 302b can be covered by the tube members 322, 332.

In a covering processing tool 300 such as above, when performing an operation of unfolding a folded portion of the folded portions 322a, 332a of the tube members 322, 332, a special operation comes to be required of moving an entirety while disassembling the core members 321, 331. Therefore, further improvement of operation efficiency is demanded. Moreover, in the covering processing tool 300 according to such a structure, because a waterproof material having liquidity (waterproof material in a paste state) cannot be disposed in the covering processing tool 300 in advance, there is a need to wrap the waterproof tape directly on the cables 302A, 302B and form the waterproof portion 302b. Here, there is a situation where a plurality of cable connection portions, which are to be covered, is formed by a plurality of cables being connected in parallel. For example, there is a situation where three cable connection portions are formed by a cable where three strands are twisted together being unraveled and divided into each strand to be three cables 302A and respectively connecting three cables 302B, where twisting is unraveled and a division is made into each strand, thereto. At this time, there is a situation where a need arises of forming the waterproof portion 302b near a root portion of an unraveled twisted portion. In a situation of wrapping the waterproof tape near a root of an unraveled twisted portion, there is a problem where a wrapping operation is difficult to perform due to interference with another cable.

As another comparative example, a covering processing tool 400 illustrated in FIG. 9 can be mentioned. In this covering processing tool 400, a tube member 412 is held in diameter expansion on a core member 411, and folded portions 412a, 412b are had by the tube member 412 being folded at both end portions of the core member 411. Note that at both end portions of the core member 411, a grounding wire 416 is also folded, and tapes 414, 415 are wrapped and held on an outer peripheral surface of the folded portions 412a, 412b.

Figure 9A:
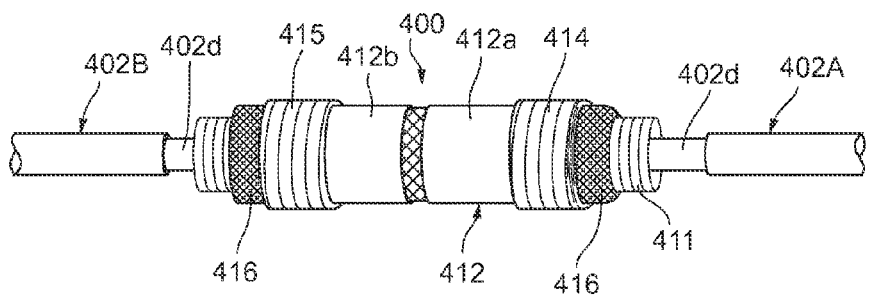
FIG. 9 is a view illustrating a covering processing method using a covering processing tool according to a comparative example.
Figure 9B:
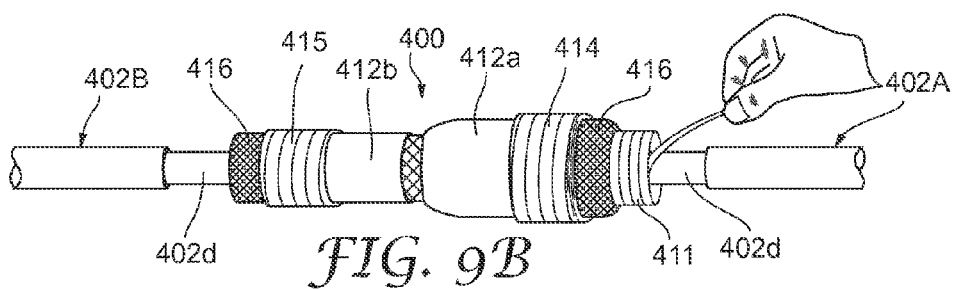
Figure 9C:
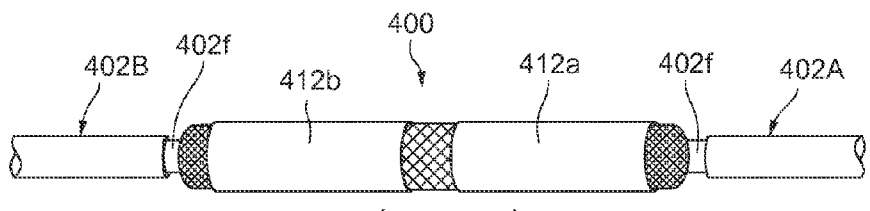
Figure 9D:
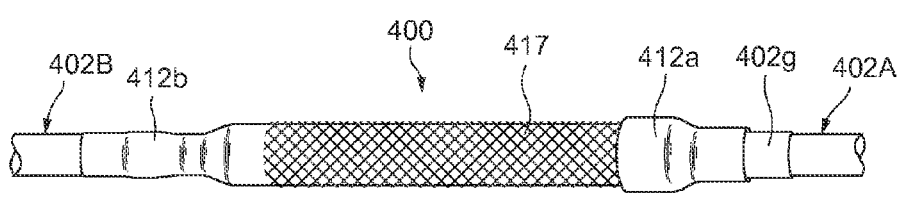
Figure 9E:
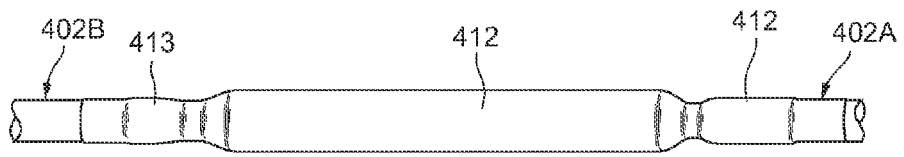

A covering processing method in a situation where the covering processing tool 400 according to the comparative example is used will be described. As illustrated in FIG. 9(a), the covering processing tool 400 is covered on the cable connection portion, and as illustrated in FIG. 9(b), by extracting and disassembling the core member 411, the tube member 412 is contracted and the cable connection portion is covered, thereby forming a grounding portion 402f. Moreover, by wrapping a waterproof tape on cables 402A, 402B, a waterproof portion 402g is formed (see FIG. 9(d)). Afterward, as illustrated in FIG. 9(d) and FIG. 9(e), by unfolding the folded portions 412a, 412b of the tube member 412, the grounding portion 402f and the waterproof portion 402g are covered. Note that a separation member 417 is disposed between a portion of the tube member 412 supported by the core member 411 and the folded portions 412a, 412b. As illustrated in FIG. 9(e), after covering, the separation member 417 is removed.

In a covering processing tool 400 such as above, when unfolding and covering the folded portions 412a, 412b of the tube member 412, the operator needs to move the folded portions 412a, 412b with force. Therefore, there is a problem where it is difficult for the operator to perform the covering operation and the operation efficiency decreases. In particular, there is a situation where the covering operation of the cable connection portion is performed in a narrowly partitioned space, but in such a narrow space, there is a problem where an operation of unfolding the folded portions 412a, 412b is difficult. Moreover, similarly to the covering processing tool 300, because a waterproof material having liquidity (waterproof material in a paste state) cannot be disposed in the covering processing tool 400 in advance, there is a need to wrap the waterproof tape directly on the cables 302A, 302B to form the waterproof portion 302b.

Figure 10:
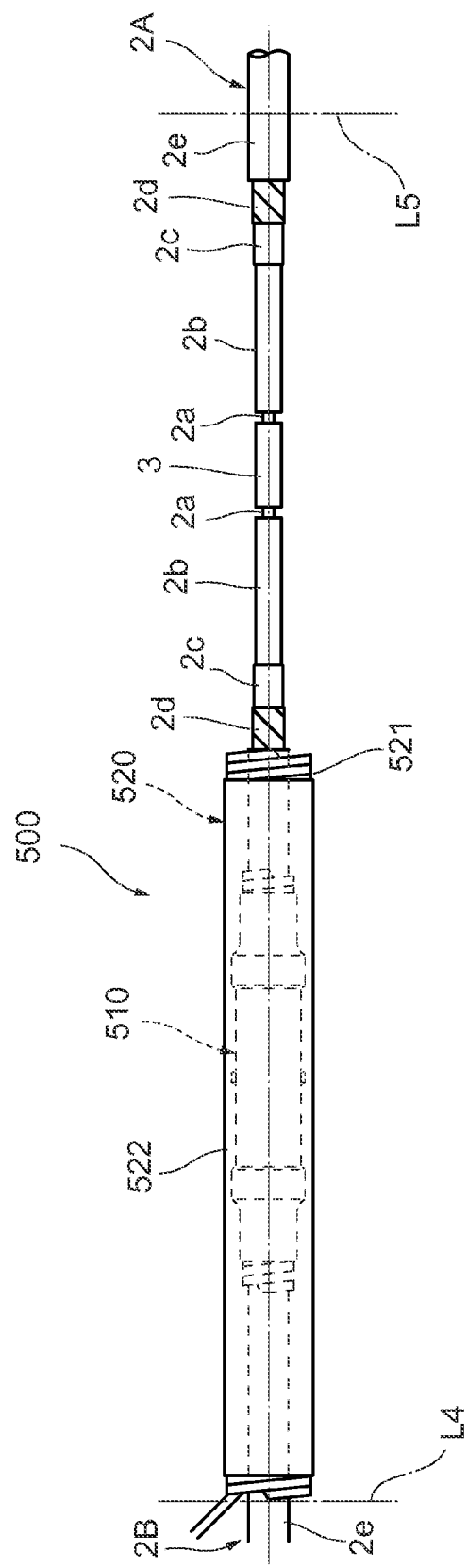
FIG. 10 is a view illustrating a covering processing tool according to a comparative example.

As another comparative example, a covering processing tool 500 illustrated in FIG. 10 can be mentioned. This covering processing tool 500 is provided with a first tubular unit 510 and a long second tubular unit 520 that are similar to the covering processing tool 1 according to the present embodiment. The second tubular unit 520 is set to a length where both end sides of a covered portion by the first tubular unit 510 can be covered with one tube member 522. As illustrated in FIG. 10, when coating grease on the connection tube 3 or the insulator 2b of the cable connection portion, there is a need to move an entirety of the covering processing tool 500 to the side, but because a total length of the covering processing tool 500 is long, there is a problem where a space necessary for the operation becomes large. Specifically, as illustrated in FIG. 10, a space comes to be required at least from an end portion position L4 of the covering processing tool 500 in a state where the covering processing tool 500 is moved to an end portion position L5 of the second tubular unit 520 at a time of the covering process.

Next, a covering processing method using the covering processing tool 1 according to the present embodiment will be described with reference to FIG. 4. At the step preceding FIG. 4(a), in a state where the covering processing tool 1 is covered on the cable, the conductor 2a of the cable 2A and the conductor 2a of the cable 2B are connected at the connection tube 3 using a crimping tool. As illustrated in FIG. 4(a), by moving the covering processing tool 1 to the side relative to the connection tube 3, among the cable connection portion 5, the connection tube 3 and each portion of the cable 2A are exposed. Grease is coated on the exposed portions. Next, as illustrated in FIG. 4(b), the covering processing tool 1 is moved so a portion where grease is not coated, that is, each portion of the cable 2B, becomes exposed. Moreover, grease is coated on the exposed portions.

Next, as illustrated in FIG. 4(c), a center of the covering processing tool 1 is aligned to a center of the cable connection portion 5, and covering by the first tubular unit 10 is performed. Specifically, by supporting the second tubular unit 20, a state is entered into where relative movement of the first tubular unit 10 relative to the second tubular unit 20 is suppressed, and in this state, the core member 11 of the first tubular unit 10 is disassembled and extracted. Moreover, by supporting the third tubular unit 30 by an advancing state of disassembly, a state is entered into where relative movement of the first tubular unit 10 relative to the third tubular unit 30 is suppressed, and in this state, the core member 11 of the first tubular unit 10 continues to be disassembled and extracted. By this, the cable connection portion 5 is covered using the first tubular unit 10 (first covering step).

Next, an operation is performed of moving the second tubular unit 20 and the third tubular unit 30 to a lateral side of the first tubular unit 10 and connecting the grounding wire 16 and the cable shielding layer 2d of the cables 2A, 2B. Next, the second tubular unit 20 is disposed in a position of PG2 illustrated in FIG. 4(c), and the third tubular unit 30 is disposed in a position of PG1 illustrated in FIG. 4(c). Moreover, by extracting and disassembling the core member 21 of the second tubular unit 20, a portion indicated by PG2 is covered (second covering step). Moreover, by extracting and disassembling the core member 31 of the third tubular unit 30, a portion indicated by PG1 is covered (third covering step).

As above, in the covering processing tool 1 and the covering processing method according to the present embodiment, in an extraction operation of the core member 11 of the first tubular unit 10, the first tubular unit 10 can be supported by supporting the second tubular unit 20, even without the operator directly supporting the first tubular unit 10. By this, an operation for moving the second tubular unit 20 for supporting the first tubular unit 10, a space for disposing the moved second tubular unit 20, and the like can be made unnecessary. By the above, an operation efficiency of covering the cable connection portion 5 can be improved.

Furthermore, in the covering processing tool 1 according to the present embodiment, the second tubular unit 20 is disposed so as to surround the first tubular unit 10 on the outer peripheral side on one end side in the axial direction of the first tubular unit 10. The third tubular unit 30 is disposed so as to surround the first tubular unit 10 on the outer peripheral side on the other end side in the axial direction of the first tubular unit 10. Moreover, the third tubular unit 30 is installed on the first tubular unit 10 so when extracting the core member 11 of the first tubular unit 10, by supporting the third tubular unit 30 from the outer peripheral side, relative movement in the axial direction and the circumferential direction of the first tubular unit 10 relative to the third tubular unit 30 is suppressed. By this, in the extraction operation of the core member 11 of the first tubular unit 10, the first tubular unit 10 can be supported by supporting the third tubular unit 30, even without the operator directly supporting the first tubular unit 10. By this, an operation for moving the third tubular unit 30 for supporting the first tubular unit 10, a space for disposing the moved third tubular unit 30, and the like can be made unnecessary.

Furthermore, unlike the covering processing tools 300, 400 according to the comparative examples, because covering can be performed using the second tubular unit 20 and the third tubular unit 30 configured separately from the first tubular unit 10, the covering operation can be performed efficiently.

Furthermore, in the covering processing tool 1 according to the present embodiment, the waterproof material having liquidity (waterproof mastics 25, 35) is disposed between the core members 21, 31 and the tube members 22, 32. For example, as with the covering processing tool 300 illustrated in FIG. 7 and the covering processing tool 400 illustrated in FIG. 9, in a situation where a structure is adopted where the tube member is folded, because the waterproof material having liquidity cannot be disposed, an operation arises of wrapping the waterproof tape on the cable. However, as in the present embodiment, by providing the second tubular unit 20 and the third tubular unit 30 independent from the first tubular unit 10, the waterproof material having liquidity can be used. By this, the operation efficiency can be improved.

Figure 5:
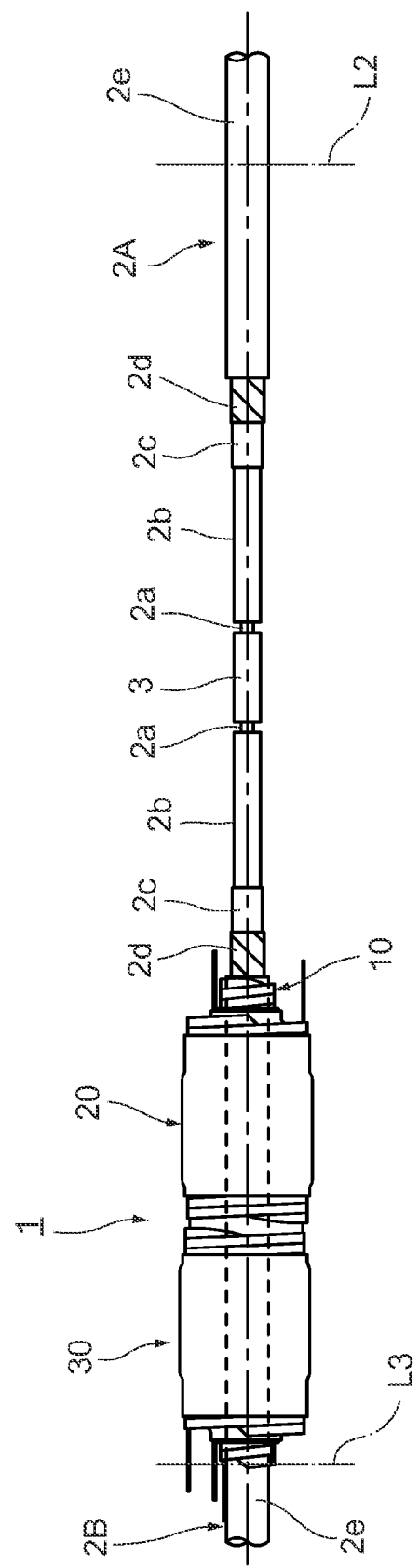
FIG. 5 is a view illustrating a positional relationship between the covering processing tool and the cable connection portion.

Furthermore, by using the covering processing tool 1 according to the present embodiment, a space required for the operation of the covering process can also be reduced. That is, the space required for the covering process of the covering processing tool 1 can be suppressed to a range from an end portion position L1 of the covering processing tool 1 in the state of FIG. 4(a) to an end portion position L2 of the covering processing tool 1 as illustrated in FIG. 4(b). This is narrower than the space required by the covering processing tool 500 illustrated in FIG. 10. Note that as illustrated in FIG. 5, in a situation of coating grease on the cable 2A and the cable 2B at once, a need arises of greatly moving the covering processing tool 1 to a position illustrated by an end portion position L3, and the space required for the covering process becomes large; therefore, it is preferable to adopt the procedure illustrated in FIG. 4.

Furthermore, because the second tubular unit 20 comes to be held from an inner side by the first tubular unit 10, it also becomes possible to prevent the diameter expansion holding member from self-destructing by a contractile force of the elastic tubular member of the second tubular unit. A similar situation exists for the third tubular unit.

The present invention is not limited to the above embodiments.

Figure 6:
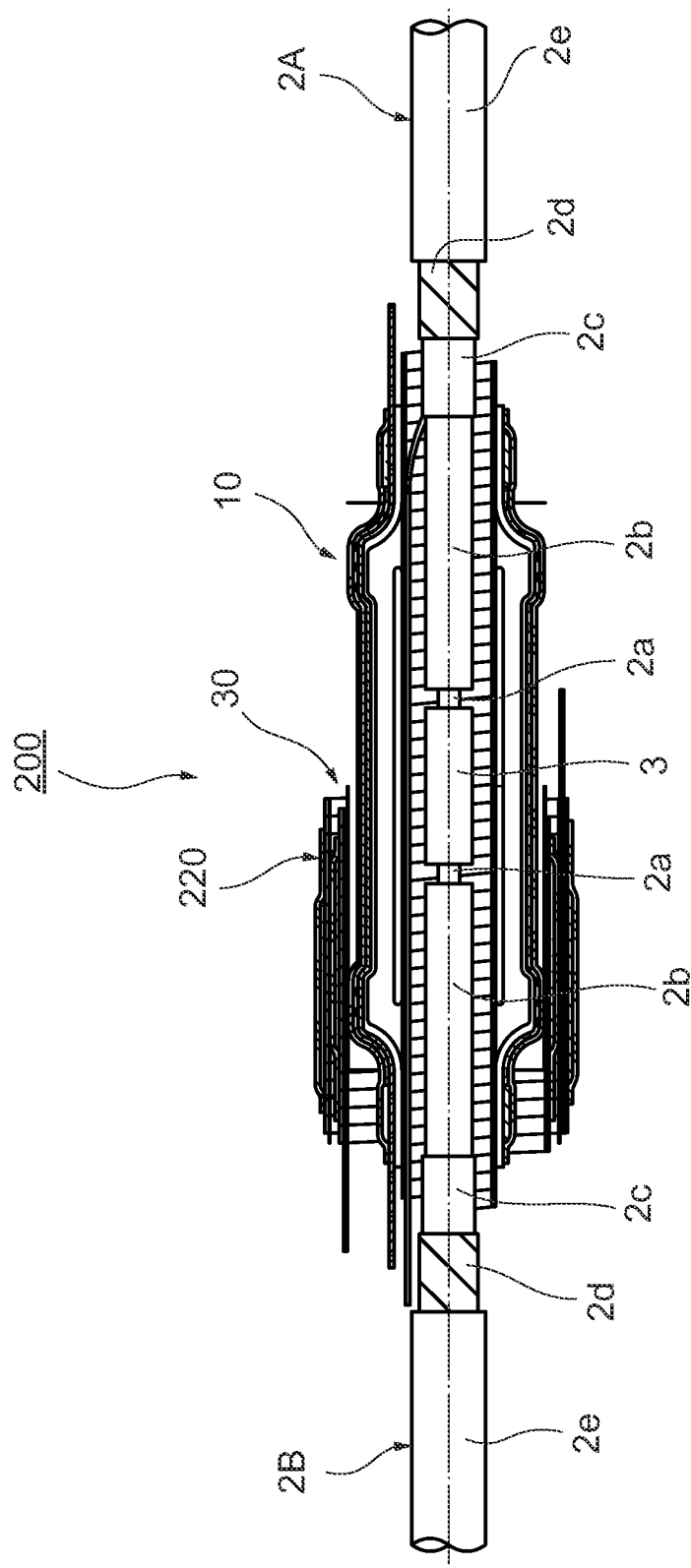
FIG. 6 is a cross-sectional view of a covering processing tool according to a modified example.

For example, a covering processing tool 200 such as that illustrated in FIG. 6 may be adopted. In the covering processing tool 200, a second tubular unit 220 is disposed so as to surround the third tubular unit 30 on the outer peripheral side. The second tubular unit 220 is installed on the first tubular unit so when extracting the first core member 11 of the first tubular unit 10, by holding the second tubular unit 220 from an outer peripheral side, relative movement in the axial direction and the circumferential direction of the first tubular unit 10 relative to the second tubular unit 220 is suppressed via the third tubular unit 30. In this situation, a gap between the second tubular unit 20 and the third tubular unit 30 is adjusted, and a gap between the third tubular unit 30 and the first tubular unit 10 is adjusted. By this, by supporting the second tubular unit 20 from the outer peripheral side, movement of the first tubular unit 10, in addition to movement of the third tubular unit 30, can be suppressed. Such an aspect is especially effective in a situation where the total length of the first tubular unit 10 is short.

Furthermore, as an example of the cable connection portion, a cable connection portion is given of a situation where one cable 2A and one cable 2B are connected. However, a structure of the cable connection portion is not limited thereto, and the covering process may be performed using the covering processing tool according to the present invention on, for example, a cable connection portion in a situation where one cable is connected to two cables.

REFERENCE SIGNS LIST 1, 200 . . . covering processing tool; 10 . . . first tubular unit; 11 . . . core member (first diameter expansion holding member); 12 . . . tube member (first elastic tubular member); 20 . . . second tubular unit; 21 . . . core member (second diameter expansion holding member); 22 . . . tube member (second elastic tubular member); 25 . . . waterproof mastic (waterproof material); 30 . . . third tubular unit; 31 . . . core member (third diameter expansion holding member); 32 . . . tube member (third elastic tubular member); 35 . . . waterproof mastic (waterproof material).

What is claimed is:

1. A covering processing tool that performs a covering process of a cable connection portion, comprising:
   a first tubular unit that extends in an axial direction;
   a second tubular unit disposed so as to surround the first tubular unit on an outer peripheral side; and
   a third tubular unit disposed so as to surround the first tubular unit on the outer peripheral side; wherein
   the first tubular unit is provided with
   a tubular and hollow first diameter expansion holding member that is extractable, and a first elastic tubular member that is held in a state of diameter expansion on an outer peripheral side of the first diameter expansion holding member;
   the second tubular unit is provided with
   a tubular and hollow second diameter expansion holding member that is extractable, and
   a second elastic tubular member that is held in a state of diameter expansion on an outer peripheral side of the second diameter expansion holding member;
   the third tubular unit is provided with
   a tubular and hollow third diameter expansion holding member that is extractable, and
   a third elastic tubular member that is held in a state of diameter expansion on an outer peripheral side of the third diameter expansion holding member; and
   the second tubular unit is installed on the first tubular unit so when extracting the first diameter expansion holding member of the first tubular unit, by supporting the second tubular unit from the outer peripheral side, relative movement in the axial direction and a circumferential direction of the first tubular unit relative to the second tubular unit is suppressed, wherein the second tubular unit is an independent and separable member from the first tubular unit and the third tubular unit.

2. The covering processing tool according to claim 1, wherein the second tubular unit is disposed so as to surround the first tubular unit on the outer peripheral side on one end side in the axial direction of the first tubular unit,
   the third tubular unit is disposed so as to surround the first tubular unit on the outer peripheral side on another end side in the axial direction of the first tubular unit, and
   the third tubular unit is installed on the first tubular unit so when extracting the first diameter expansion holding member of the first tubular unit, by supporting the third tubular unit from the outer peripheral side, relative movement in the axial direction and the circumferential direction of the first tubular unit relative to the third tubular unit is suppressed.

3. The covering processing tool according to claim 1, wherein the second tubular unit is disposed so as to surround the third tubular unit on the outer peripheral side, and the second tubular unit is installed on the first tubular unit so when extracting the first diameter expansion holding member of the first tubular unit, by supporting the second tubular unit from the outer peripheral side, relative movement in the axial direction and the circumferential direction of the first tubular unit relative to the second tubular unit is suppressed via the third tubular unit.

4. The covering processing tool according to claim 1, wherein a waterproof material having liquidity is disposed between the second diameter expansion holding member and the second elastic tubular member and between the third diameter expansion holding member and the third elastic tubular member.

5. A covering processing method that performs a covering process of a cable connection portion using a covering processing tool,
   the covering processing tool provided with
   a first tubular unit that extends in an axial direction,
   a second tubular unit disposed so as to surround the first tubular unit on an outer peripheral side, and
   a third tubular unit disposed so as to surround the first tubular unit on the outer peripheral side;
   the first tubular unit provided with
   a tubular and hollow first diameter expansion holding member that is extractable, and
   a first elastic tubular member that is held in a state of diameter expansion on an outer peripheral side of the first diameter expansion holding member;
   the second tubular unit provided with
   a tubular and hollow second diameter expansion holding member that is extractable, and
   a second elastic tubular member that is held in a state of diameter expansion on an outer peripheral side of the second diameter expansion holding member; and
   the third tubular unit provided with
   a tubular and hollow third diameter expansion holding member that is extractable, and
   a third elastic tubular member that is held in a state of diameter expansion on an outer peripheral side of the third diameter expansion holding member, wherein the second tubular unit is an independent and separable member from the first tubular unit and the third tubular unit; comprising:
   a first covering step that contracts the first elastic tubular member by extracting the first diameter expansion holding member of the first tubular unit and covers the cable connection portion with the contracted first elastic tubular member;
   a second covering step that contracts the second elastic tubular member by extracting the second diameter expansion holding member of the second tubular unit and covers the cable connection portion on one end side in the axial direction of the first elastic tubular member with the contracted second elastic tubular member; and
   a third covering step that contracts the third elastic tubular member by extracting the third diameter expansion holding member of the third tubular unit and covers the cable connection portion on another end side in the axial direction of the first elastic tubular member with the contracted third elastic tubular member; wherein
   in the first covering step, when extracting the first diameter expansion holding member, by supporting the second tubular unit from the outer peripheral side, relative movement in the axial direction and a circumferential direction of the first tubular unit relative to the second tubular unit is suppressed.

* * * * *

UNITED STATES PATENT AND TRADEMARK OFFICE
CERTIFICATE OF CORRECTION

PATENT NO. : 10,381,818 B2
APPLICATION NO. : 15/328338
DATED : August 13, 2019
INVENTOR(S) : Tsunehisa Nakamura Page 1 of 1

It is certified that error appears in the above-identified patent and that said Letters Patent is hereby corrected as shown below:

In the Specification

Column 9,
Line 35, delete "$D2 < D1+t$" and insert -- $D2 \leq D1+t$ -- therefor.

Signed and Sealed this
Twenty-first Day of January, 2020

Andrei Iancu
*Director of the United States Patent and Trademark Office*